April 27, 1937.   E. SCHULZE   2,078,691
PROTECTIVE SYSTEM
Filed Aug. 30, 1933   3 Sheets-Sheet 1
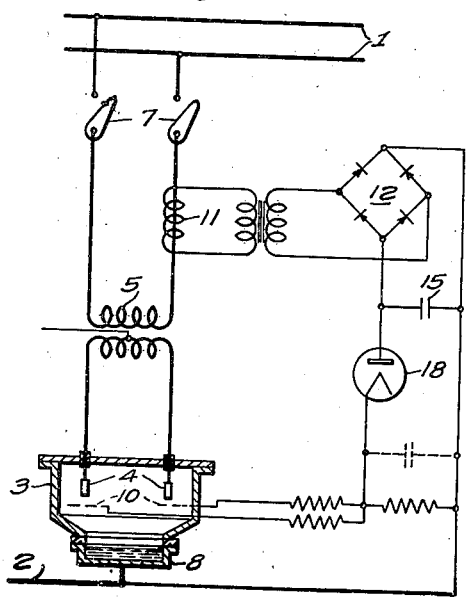
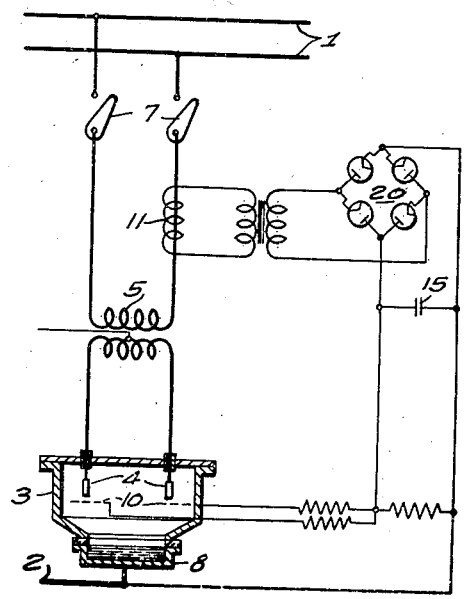
WITNESSES:
E. A. McCloskey
S. A. Stricklett
INVENTOR
Ernst Schulze.
BY
ATTORNEY April 27, 1937.  E. SCHULZE  2,078,691
PROTECTIVE SYSTEM
Filed Aug. 30, 1933  3 Sheets-Sheet 2
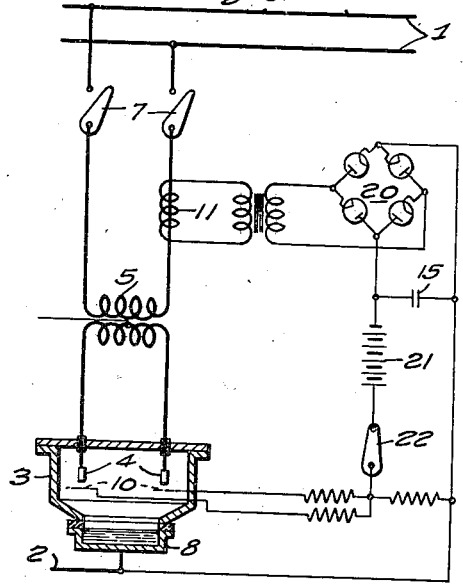
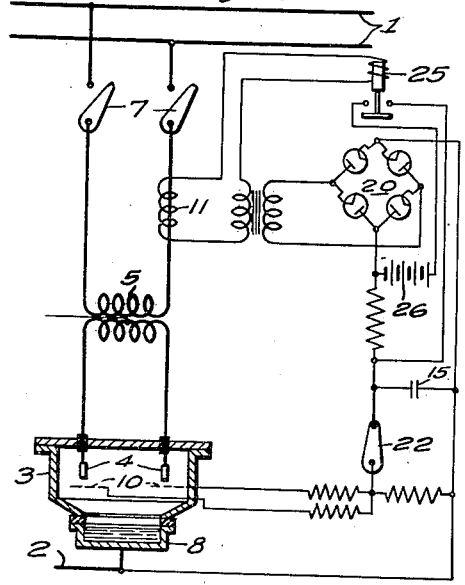
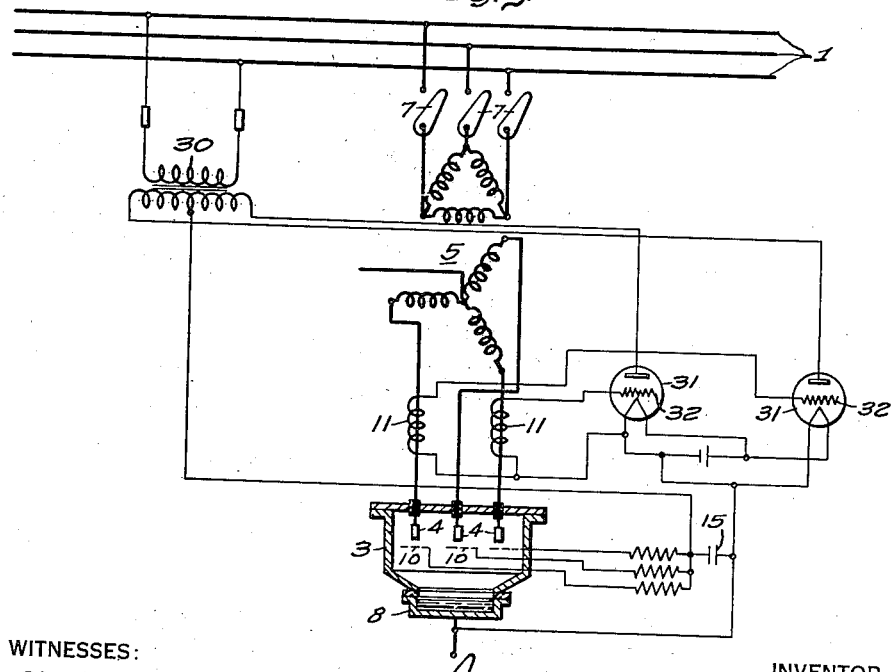
WITNESSES:
E. A. McCloskey
S. A. Stricklett
INVENTOR
Ernst Schulze
BY O. B. Buchanan
ATTORNEY

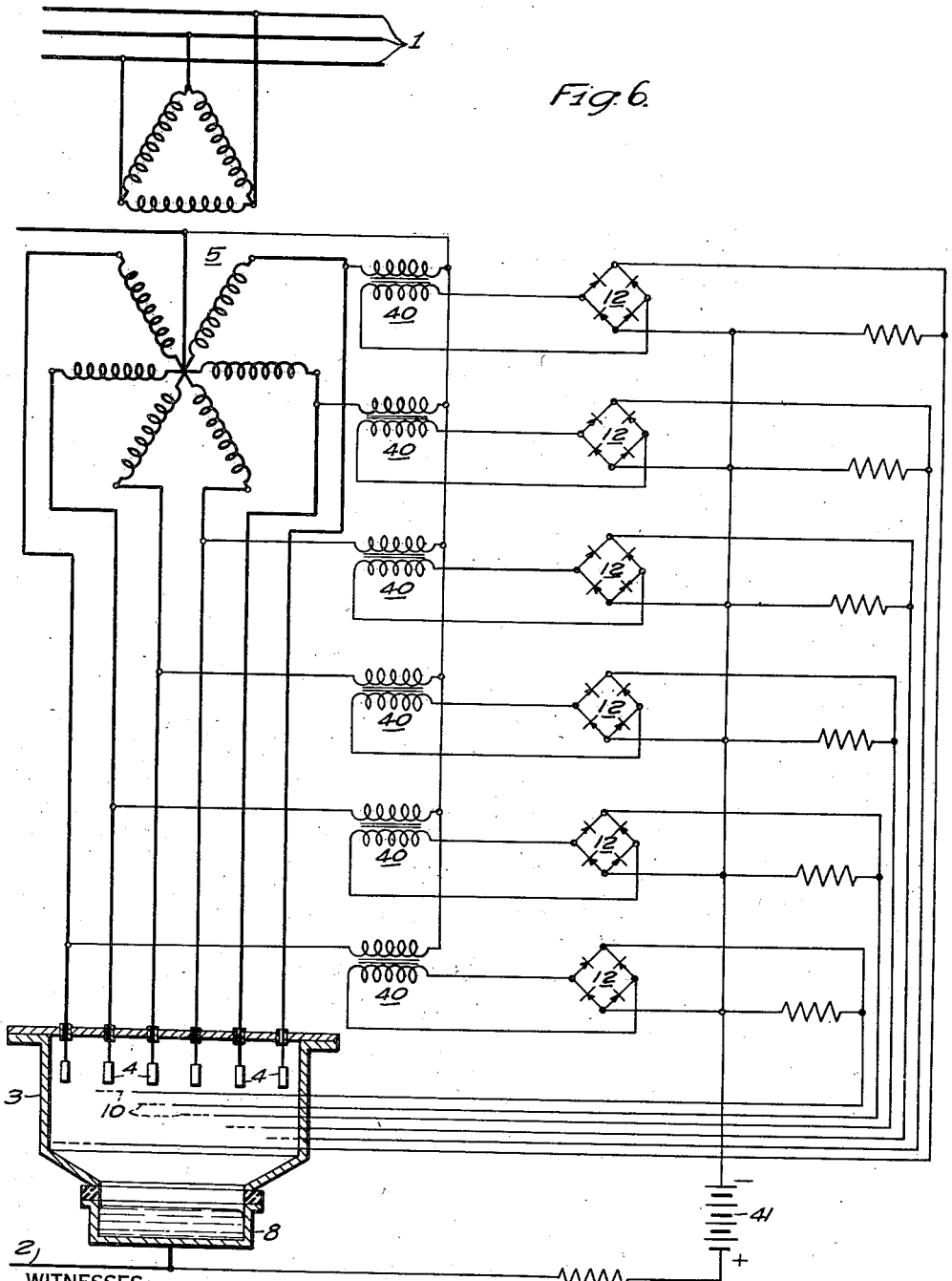

Patented Apr. 27, 1937

2,078,691

UNITED STATES PATENT OFFICE 2,078,691

PROTECTIVE SYSTEM

Ernst Schulze, Finkenkrug, near Spandau, Germany, assignor to Westinghouse Electric & Manufacturing Company, East Pittsburgh, Pa., a corporation of Pennsylvania Application August 30, 1933, Serial No. 687,537
In Germany August 30, 1932

4 Claims. (Cl. 175—363)

My invention relates to a protective system for an electric converter and particularly to a protective device for extinguishing arc-backs in vapor electric converters without removing the converter from service.

In the operation of metal vapor or gas-filled discharge devices there is an inherent disadvantage in that the converters are liable to internal disturbances such as arc-backs or internal short-circuits.

It has been customary to extinguish these disturbances either by disconnecting the converter or by establishing control by means of grids or similar control devices. In these previous schemes of protection there is a disadvantage in that the rectifier must be removed from service to eliminate the disturbance.

It is an object of my invention to provide a grid-controlled rectifier system in which the disturbance may be interrupted and the converter returned to service in a time insufficient to cause disturbances on the system connected to the converter.

It is an object of my invention to provide a control system dependent on the current or voltage characteristics of the converter for establishing a control potential for extinguishing arc-backs or short circuits in a converter.

It is a further object of my invention to provide a control system which automatically operates to extinguish the disturbance in a rectifier and to place the same back on the line as soon as the disturbance is ended.

Other objects and advantages of my invention will be apparent from the following detailed description taken in conjunction with the accompanying drawings in which:

Fig. 1 is a schematic illustration of a converter system for regulating the control system.

Fig. 2 is a modified form of my invention.

Fig. 3 is a modification having means for removing the converter from service.

Fig. 4 is a modification for applying a lock-out in case of repeated backfires.

Fig. 5 is a modified system of control for my invention, and

Fig. 6 is a modification for applying the phase voltage of the converter for extinguishing disturbances therein.

The apparatus according to my invention comprises an alternating current line 1 and a direct current line 2 connected by a suitable valve-type converter such as a mercury arc rectifier 3. The valves 4 of the converter 3 are supplied through a suitable transformer 5 which has a winding connected through suitable disconnecting switches 7 to the alternating current system 1. The cathode 8 of the converter 3 is connected to one side of the direct current system 2, while the other side of the direct current system 2 is connected to the neutral point of the supply transformer 5. Each of the valves 4 of the converter 3 is provided with a control grid 10, the control potential of which is supplied by a current transformer 11 in the connection to the supply transformer 5.

The output of the current transformer 11 is rectified by a suitable full-wave rectifier 12 and applied to the control grids 10.

The rectifier output of the auxiliary rectifier 12 is proportional to the current in the converter. For normal operation of the converter, it is desirable to block the application of the rectified current to the grid 10 and maintain the converter in operating condition. When a disturbance such as a backfire or short circuit occurs in the converter, the current transformer 11 provides a voltage sufficient to overcome the blocking means 14 and apply a blocking potential to the grids 10.

The blocking potential supplied by the transformer 11 will cease as soon as the disturbance in the converter is extinguished. However, it is desirable to maintain the converter in blocked condition for an interval sufficient to permit substantial deionization in the arc path of the converter. For this purpose I provide a potential storing device such as a capacitor 15 for maintaining the blocking potential for a suitable interval after the cessation of current through the converter.

An electron discharge device such as a glow tube 18 may be inserted in series with the rectified voltage from the current transformer as shown in Fig. 1. This glow tube has a voltage characteristic such that normal voltage of the current transformer will be prevented from reaching the control grids. However, if a disturbance occurs in a converter an excess potential will be applied to the discharge tube which will break down and permit control potential to be applied to the grids.

In the modification of my system according to Fig. 2 the rectifying and blocking characteristics are combined in a single device, a plurality of discharge devices such as glow tubes being connected to provide a full-wave rectifier 20 which breaks down on the application of suitable potential to put a blocking potential on the control grids 10.

It is a characteristic of discharge devices such as glow tubes, after the discharge has been initiated a smaller potential will maintain the discharge. In the modification according to Fig. 3

I employ this characteristic to maintain the converter 3 in inoperative condition after a disturbance has occurred therein. For this purpose I provide a suitable source of potential 21 in series with the glow tube rectifier 20. After the glow tubes have broken down the auxiliary potential 21 will maintain the glow tubes in operation and apply biasing potential to keep the control grids 10 in inoperative condition. A suitable device such as a switch 22 may be used for interrupting the blocking potential and permit the converter to be placed in service.

In many cases it is desirable to lock out a converter after a series of disturbances therein. In the modification according to Fig. 4 I have provided a relay 25 which operates after a predetermined number of operations of the control device to apply an auxiliary potential 26 to maintain the control grids in blocked condition.

Relays are inherently slow acting devices and the application of the surge potential to the relay actuates it so slowly that before the contacts of the relay can close to apply the potential 26 the disturbance has cleared and the converter is back in the line. However, the relay remains closed and at the next following disturbance the auxiliary voltage source will maintain the tubes in operation and thus lock out the converter. By the use of suitable relays or combinations thereof any desired number of operations may be permitted before the converter is locked out.

In the modification according to Fig. 5 the blocking potential is supplied from a suitable auxiliary source such as a transformer 30 and controlled by means of auxiliary grid controlled discharge devices 31, the control grids 32 being energized from the current transformers 11.

When a disturbance occurs in a vapor-electric converter, the phase potential of the phases involved in the disturbance falls to a very low value. In the modification according to Fig. 6 I utilize this characteristic by inserting potential transformers 40 across each phase of the converter supply. When normal potential is applied to the valves 4 of the converter 3 the potential transformers 40 supply sufficient potential to neutralize a biasing potential supplied from a suitable source such as a battery 41. However, should a fault occur in one of the phases, the potential transformer 40 connected to that phase will produce insufficient voltage to neutralize the biasing potential which accordingly blocks the succeeding control grid 10. Each grid 10 is blocked in turn until the disturbance has ceased and the potential rises sufficiently to again neutralize the blocking potential 41.

While I have shown and described specific embodiments of my invention, it will be apparent to those skilled in the art that changes and modifications may be made therein without departing from the true spirit thereof or from the scope of the appended claims.

I claim as my invention:

1. A protective system for a vapor-electric converter, comprising a source of potential varying with the current in said converter, a control element in said converter, an auxiliary discharge means for impressing a control voltage on said control element when the said source of potential delivers a predetermined voltage, and an auxiliary potential source operative after a predetermind number of applications of said predetermined voltage to maintain the control voltage on the control element.

2. A protective system for a vapor-electric converter, comprising a source of potential varying with the current in said converter, a control element in said converter, an auxiliary discharge means for impressing the potential of said source on said control member when said source of potential delivers a predetermined voltage, an auxiliary source of potential and relay means operated from said source of potential for connecting said auxiliary source to maintain a control voltage on said control element.

3. An electrical converter system comprising a plurality of electrical distribution circuits, a vapor electric converter for transferring energy between said circuits, grid means for controlling the current in said converter, a transformer providing a potential responsive to the current conditions in said converter, means for rectifying the current produced by said transformer, connection for impressing said rectified potential on said grid means, means in series with said connection for blocking the application of normal potential to said grid means, said means being responsive to abnormal potential to apply the rectified potential of said transformer to said grids.

4. An electrical converter system comprising a plurality of electrical distribution circuits, a vapor electric converter for transferring energy between said circuits, grid means for controlling the current in said converter, a transformer providing a potential responsive to the current conditions in said converter, means for rectifying the current produced by said transformer, connection for impressing said rectified potential on said grid means, means in series with said connection for blocking the application of normal potential to said grid means, said means being responsive to abnormal potential to apply the rectified potential of said transformer to said grids, and an auxiliary potential active in response to the application of said abnormal potential to maintain a blocking potential on said grid means.

ERNST SCHULZE.